(12) United States Patent
Matsuura

(10) Patent No.: US 11,906,477 B2
(45) Date of Patent: Feb. 20, 2024

(54) MATERIAL TESTING MACHINE AND CONTROL DEVICE OF MATERIAL TESTING MACHINE

(71) Applicant: SHIMADZU CORPORATION, Kyoto (JP)

(72) Inventor: Tohru Matsuura, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/511,538

(22) Filed: Oct. 26, 2021

(65) Prior Publication Data
US 2022/0146386 A1    May 12, 2022

(30) Foreign Application Priority Data
Nov. 9, 2020    (JP) .................. 2020-186438

(51) Int. Cl.
*G01N 3/08*    (2006.01)
*G01N 3/02*    (2006.01)
*G01N 3/06*    (2006.01)

(52) U.S. Cl.
CPC .................. *G01N 3/08* (2013.01); *G01N 3/02* (2013.01); *G01N 2203/0017* (2013.01)

(58) Field of Classification Search
CPC .... G01N 2203/0017; G01N 3/02; G01N 3/06; G01N 3/307; G01N 3/08; G01N 3/10; G01N 3/34; G01N 17/00; G06F 3/044; G06F 1/3265; G06F 3/016; G06F 11/36; G06F 3/0482; G06F 3/0416; G05B 19/054; G05B 19/4093; G05B 19/414; G01D 18/00; H04N 1/00973; E02F 9/2025; G10L 15/22
See application file for complete search history.

(56) References Cited

U.S. PATENT DOCUMENTS

2017/0300035 A1* 10/2017 Kawai .................. G05B 19/409

FOREIGN PATENT DOCUMENTS

| JP | 2002062228 | 2/2002 |
|---|---|---|
| JP | 2003207429 | 7/2003 |
| WO | 2016051544 | 4/2016 |

OTHER PUBLICATIONS

"Office Action of Japan Counterpart Application", dated Oct. 31, 2023, with English translation thereof, pp. 1-7.

* cited by examiner

*Primary Examiner* — Brandi N Hopkins
(74) *Attorney, Agent, or Firm* — JCIPRNET

(57) ABSTRACT

A tensile testing machine includes: a testing machine body that executes a tensile test; an instruction reception unit that receives an operation instruction for the testing machine body on the basis of an operation from a user; and an instruction storage unit that stores contents and an order of instruction information indicating the operation instruction, which is received by the instruction reception unit, for the testing machine body.

7 Claims, 10 Drawing Sheets

| SN | CP | MC |
|---|---|---|
| STEP NUMBER | OPERATION BY USER | INSTRUCTION FOR TESTING MACHINE BODY |
| 1 | PRESS ACTIVATION BUTTON | Power Unit ON (STANDBY 10 SECONDS) |
| 2 | SET LIMIT CONDITION FOR SAFETY UPPER LIMIT TEST FORCE 1kN LOWE LIMIT TEST FORCE -1kN | LIMIT SETTING TEST FORCE 1kN, -1kN (STANDBY 10 SECONDS) |
| 3 | PRESS PRESSURE BUTTON | LOAD ON (STANDBY 10 SECONDS) |
| 4 | RAISE OPERATION HYDRAULIC PRESSURE TO 12 Mpa | HYDRAULIC PRESSURE CHANGE 12MPa (STANDBY 10 SECONDS) |
| 5 | TAKE ACTUATOR TO 0 mm POSITION IN 10 SECONDS | AVERAGE VALUE MOVEMENT DISPLACEMENT CONTROL 10 SECONDS (STANDBY 10 SECONDS) |
| 6 | EXECUTE TEST EXECUTION LOW-SPEED OPERATION (0.1 HZ ± 25 mm FOR 30 MINUTES) | TEST EXECUTION LOW-SPEED OPERATION (0.1Hz±25mm 30 MINUTES) (STANDBY 10 SECONDS) |
| 7 | SET CURRENT VALUE OF MEASUREMENT DEVICE (LOAD CELL) TO 0 | TEST FORCE 0 OFFSET (STANDBY 1 SECOND) |
| 8 | SET CURRENT VALUE OF MEASUREMENT DEVICE (DISPLACEMENT GAUGE) TO 0 | DISPLACEMENT GAUGE 0 OFFSET |

| NP | CM | PR |
|---|---|---|
| ID | COMMAND | ARGUMENT |
| 114 | ZERO SHIFT | ZERO TARGET SIGNAL |
| 219 | AVERAGE VALUE MOVEMENT (TIME SETTING) | LOAD TIME |
| | | ARRIVAL VALUE |
| | | MONITORING TARGET SIGNAL |
| 246 | TEST EXECUTION INSTRUCTION | TEST NUMBER |
| 401 | SETTING OF LIMIT EXCEEDANCE LIMIT CONDITION | TARGET SIGNAL |
| | | UPPER LIMIT/LOWER LIMIT |
| | | VALIDITY/INVALIDITY |
| | | LIMIT VALUE |
| | | OPERATION AFTER LIMIT |
| | | OUTPUT (HYDRAULIC SOURCE, MANIFOLD, CONTACT POINT, SYNCHRONIZATION) TO OUTSIDE |
| 551 | ACTIVATION OF HYDRAULIC SOURCE | PUMP NUMBER(1,2) |
| 552 | STOP OF HYDRAULIC SOURCE | |
| 553 | HYDRAULIC SOURCE LOAD INSTRUCTION | |

FIG. 6

MATERIAL TESTING MACHINE AND CONTROL DEVICE OF MATERIAL TESTING MACHINE

INCORPORATION BY REFERENCE

The present application claims priority under 35 U.S.C. § 119 to Japanese Patent Application No. 2020-186438 filed on Nov. 9, 2020. The content of the application is incorporated herein by reference in its entirety.

BACKGROUND

Technical Field

The present invention relates to a material testing machine and a control device of the material testing machine.

Related Art

Various techniques for reducing labor of an operator in a material testing machine are known.

For example, every time an operation unit such as an operation panel or a keyboard is operated after a command is given, a material testing machine described in JP 2003-207429 A sequentially stores the operation, and outputs an operation history based on the stored content as an operation procedure manual in a predetermined format.

SUMMARY

However, in the material testing machine described in JP 2003-207429 A, it is necessary for an operator to perform an operation while referring to the generated operation procedure manual, and thus there has been a demand for further reducing the labor of the operator.

Further, in a case where the operator performs an operation while referring to the generated operation procedure manual, there is a possibility that an erroneous operation occurs, and it is necessary to suppress the erroneous operation.

The present invention has been made in view of such circumstances, and an object thereof is to provide a material testing machine capable of reducing labor of an operator and suppressing occurrence of an erroneous operation, and a control device of the material testing machine.

A material testing machine according to a first aspect of the present invention includes: a testing machine body that executes a material test; an instruction reception unit that receives an operation instruction for the testing machine body on the basis of an operation from a user; and an instruction storage unit that stores contents and an order of instruction information indicating the operation instruction, which is received by the instruction reception unit, for the testing machine body.

A control device of a material testing machine according to a second aspect of the present invention is communicably connected to a testing machine body executing a material test and controls an operation of the testing machine body, the control device including: an instruction reception unit that receives an operation instruction for the testing machine body on the basis of an operation from a user; and an instruction storage unit that stores contents and an order of instruction information indicating the operation instruction, which is received by the instruction reception unit, for the testing machine body.

The material testing machine according to the first aspect of the present invention and the control device of the material testing machine according to the second aspect of the present invention store the contents and the order of the instruction information indicating the operation instruction for the testing machine body, and thus the testing machine body can be operated on the basis of the instruction information. Therefore, it is possible to reduce the labor of the operator and suppress the occurrence of the erroneous operation.

BRIEF DESCRIPTION OF DRAWINGS

FIG. 4 is a table illustrating an example of a relationship between an operation of a user and an instruction for a testing machine body;

FIG. 6 is a table illustrating an example of a command for which an instruction reception unit recognizes an instruction;

DETAILED DESCRIPTION

Hereinafter, this embodiment will be described with reference to the drawings.

1. Configuration of Tensile Testing Machine

Figure 1:
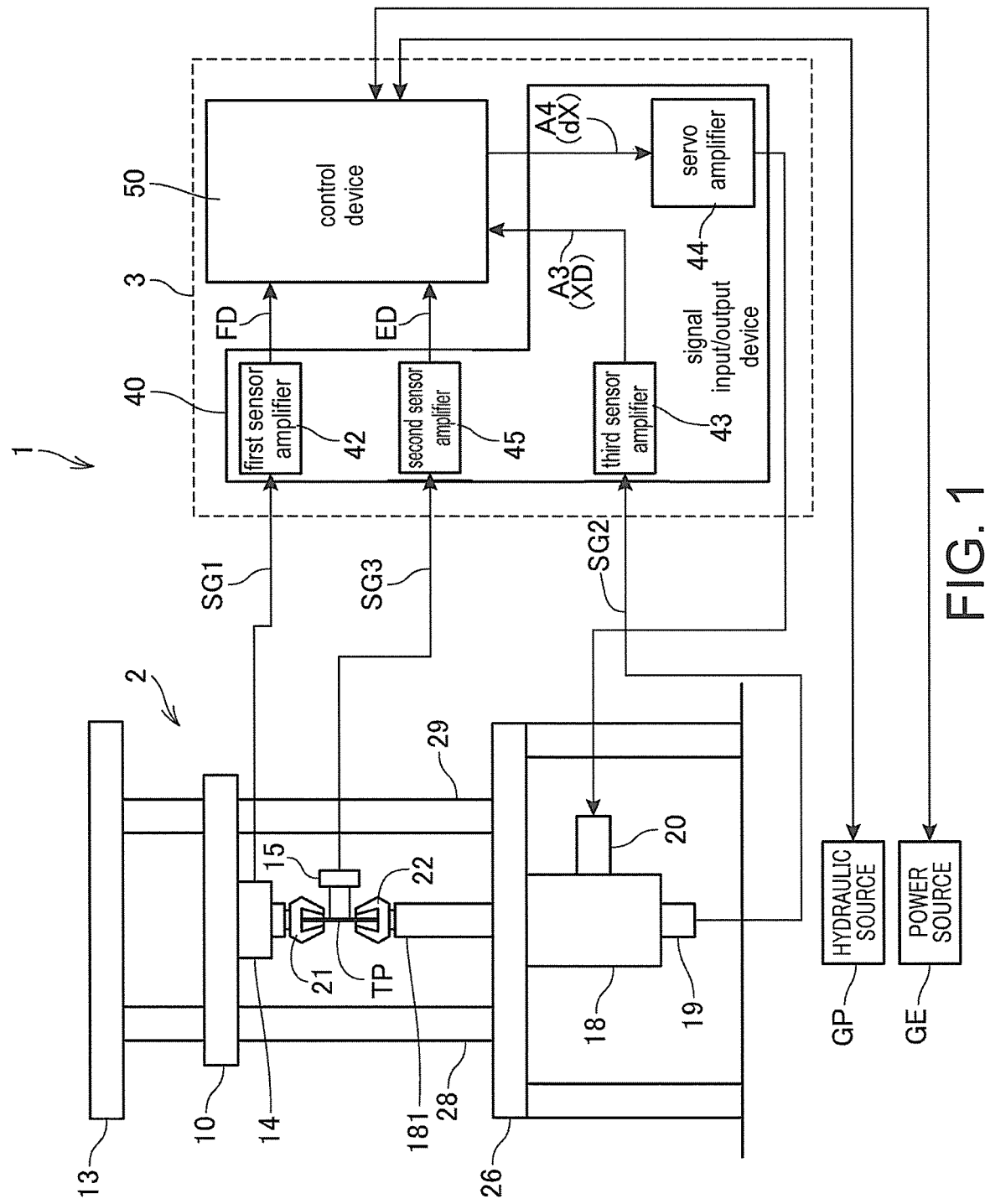
FIG. 1 is a diagram illustrating an example of a configuration of a tensile testing machine according to this embodiment.

FIG. 1 is a diagram illustrating an example of a configuration of a tensile testing machine 1 according to this embodiment.

The tensile testing machine 1 of this embodiment performs a tensile test for measuring mechanical properties such as tensile strength, yield point, elongation, and drawing of a sample by applying a test force F to a test piece TP. The test force F is a tensile force.

The tensile testing machine 1 includes a testing machine body 2 that performs a tensile test by applying the test force F to the test piece TP which is a material to be tested, and a control unit 3 that controls a tensile test operation by the testing machine body 2.

Incidentally, the tensile testing machine 1 corresponds to an example of a "material testing machine".

As illustrated in FIG. 1, the testing machine body 2 is configured such that a load frame is formed on a base 26 by a pair of pillars 28 and 29 and a yoke 13, and a crosshead 10 is fixed to the pillars 28 and 29.

A hydraulic actuator 18 is disposed on the base 26, and a lower gripper 22 for gripping the lower end portion of the test piece TP is attached to a piston rod 181 of the hydraulic actuator 18. An upper gripper 21 for gripping the upper end portion of the test piece TP is attached to the crosshead 10 via a load cell 14.

In the hydraulic actuator 18, a pressure oil direction and a pressure oil amount are controlled by a servo valve 20, and the piston rod 181 expands and contracts. As a result, a gap between the upper gripper 21 and the lower gripper 22 expands and contracts, and the test force F is applied to the test piece TP fixed between the upper gripper 21 and the lower gripper 22. Further, the stroke of the hydraulic actuator 18, that is, the displacement of the test piece TP is detected by a differential transformer 19 attached to the hydraulic actuator 18.

The load cell 14 is a sensor that measures the test force F, which is a tensile load applied to the test piece TP, and outputs a test force measurement signal SG1 to the control unit 3.

The differential transformer 19 is a sensor that measures a displacement amount of the test piece TP and outputs a displacement measurement signal SG2 corresponding to the displacement amount to the control unit 3.

The displacement sensor 15 is disposed on the test piece TP. As the test piece TP, for example, a dumbbell-shaped test piece formed with the center constricted is used. The displacement sensor 15 measures an elongation measurement value ED by measuring a distance between a pair of gauge points of the test piece TP, and outputs an elongation measurement signal SG3 to the control unit 3. The pair of gauge points are disposed at an upper portion and a lower portion of the region where the test piece TP is constricted.

The testing machine body 2 further includes a power source GE and a hydraulic source GP.

The power source GE supplies power to each part of the testing machine body 2. The power source GE supplies power to, for example, various motors and drives the motors. Further, the power source GE supplies power to a hydraulic pump and a hydraulic control valve (not illustrated) to perform driving.

The power source GE is configured as, for example, a voltage source. The power source GE supplies a corresponding voltage to each part of the testing machine body 2. For example, the power source GE supplies a voltage of 100 V to the hydraulic pump and the various motors, and supplies a voltage of 10 V to the control unit 3.

The power source GE is configured to generate, for example, DC 10 V, which is the voltage supplied to the control unit 3 or the like, from AC 100V from a commercial power supply. The power source GE has a configuration to step down the voltage, such as a transformer, as well as a configuration to convert AC to DC, which has an AD converter, a rectifier circuit (a diode, or the like), a smoothing circuit (a capacitor or the like). The power source GE may have a battery for power outage measures or momentary power failure measures.

The hydraulic source GP supplies a hydraulic pressure to a hydraulic device configuring the testing machine body 2. For example, the hydraulic source GP supplies a hydraulic pressure to the hydraulic actuator 18 to drive the hydraulic actuator 18. That is, the hydraulic actuator 18 is driven by the hydraulic pressure supplied from the hydraulic source GP, and the piston rod 181 is expanded and contracted.

The hydraulic source GP includes a hydraulic pump and a hydraulic control valve (not illustrated), and generates a hydraulic pressure by driving the hydraulic pump. Power is supplied from the power source GE to the hydraulic pump. The hydraulic control valve adjusts the hydraulic pressure output from the hydraulic source GP.

The control unit 3 includes a signal input/output device 40 and a control device 50.

The signal input/output device 40 configures an input/output interface circuit that transmits and receives a signal to and from the testing machine body 2, and in this embodiment, includes a first sensor amplifier 42, a second sensor amplifier 45, a third sensor amplifier 43, and a servo amplifier 44.

The first sensor amplifier 42 is an amplifier that amplifies the test force measurement signal SG1 output from the load cell 14 to generate a test force measurement value FD, and outputs the test force measurement value FD to the control device 50.

The second sensor amplifier 45 is an amplifier that amplifies the elongation measurement signal SG3 output from the displacement sensor 15 to generate the elongation measurement value ED and outputs the elongation measurement value ED to the control device 50.

The third sensor amplifier 43 amplifies the displacement measurement signal SG2 output from the differential transformer 19 and outputs, to the control device 50, a displacement measurement signal A3 indicating a displacement measurement value XD as a digital signal.

The servo amplifier 44 is a device that controls the servo valve 20 according to the control of the control device 50. The control device 50 calculates a command value dX of the displacement measurement value XD and transmits, to the servo valve 20, a command signal A4 indicating the command value dX.

2. Configuration of Control Device

The control device 50 controls the operation of the testing machine body 2 on the basis of an operation from a user. Further, the control device 50 causes the testing machine body 2 to execute a tensile test.

In this embodiment, the "user" includes an operator who operates the testing machine body 2.

The control device 50 includes a computer including a storage device such as a hard disk drive (HDD) or a solid state drive (SSD), an interface circuit with the signal input/output device 40, and various electronic circuits.

Further, an A/D converter is provided in an interface circuit with the signal input/output device 40, and the test force measurement signal SG1, the elongation measurement signal SG3, and the displacement measurement signal SG2 of the analog signals are converted into digital signals by the A/D converter.

Incidentally, the control device 50 is not limited to the computer, and may be configured by one or a plurality of appropriate circuits such as an integrated circuit such as an IC chip and as an LSI.

Figure 2:
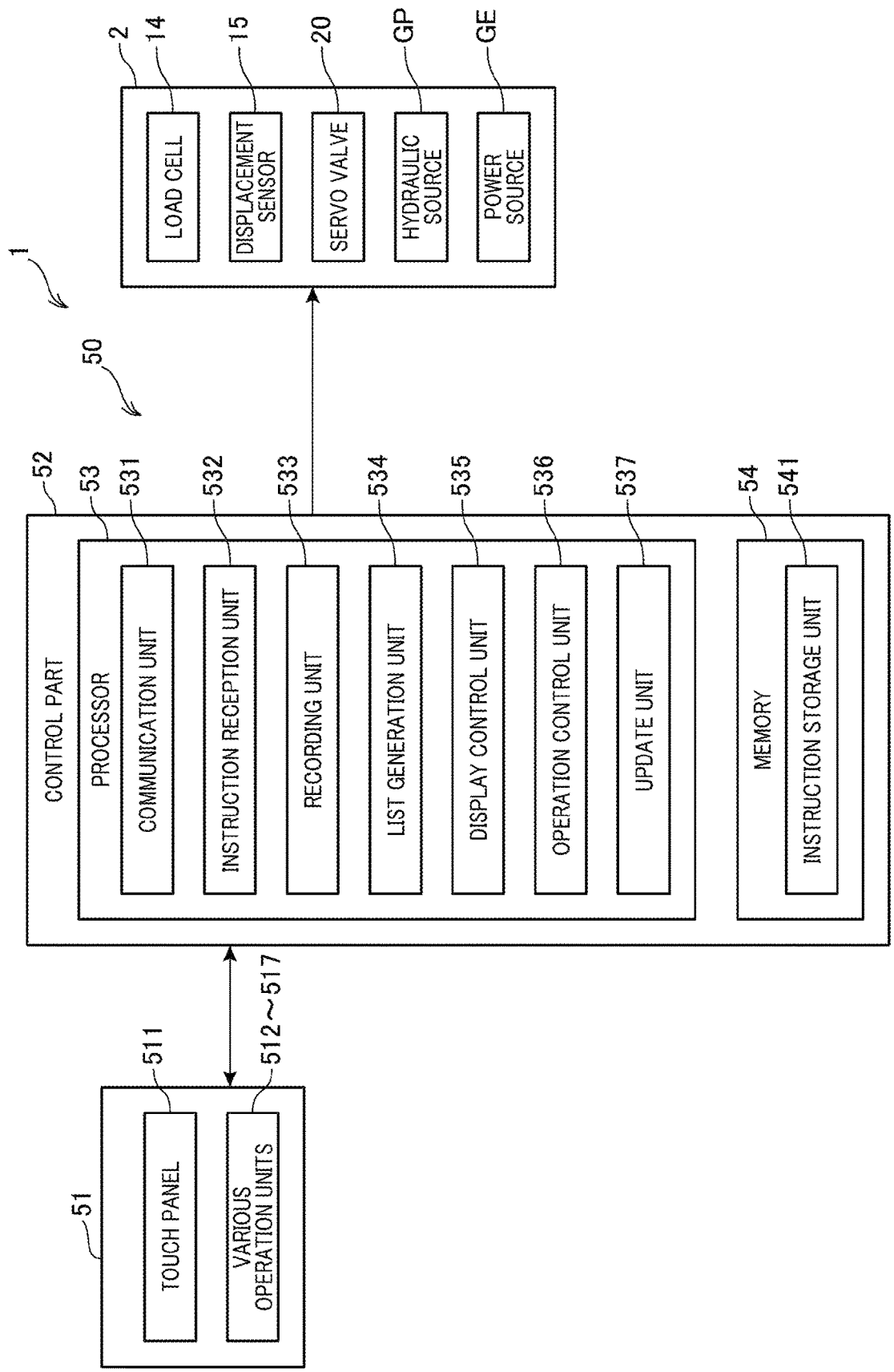
FIG. 2 is a diagram illustrating an example of a configuration of a control device according to this embodiment.

FIG. 2 is a diagram illustrating an example of a configuration of the control device 50 according to this embodiment.

The control device 50 includes an operation panel 51 and a control part 52.

The operation panel 51 includes a touch panel 511 and a plurality of operation units 512 to 517.

The touch panel 511 includes a liquid crystal display (LCD) or the like, and displays various images on the LCD according to an instruction from the control part 52. Further, the touch panel 511 includes a touch sensor disposed along a display surface of the LCD. The touch sensor detects a touch of the fingertip of the user or pen, and transmits a detection signal to the control part 52.

The plurality of operation units 512 to 517 will be described with reference to FIG. 3.

The touch panel 511 corresponds to an example of a "display".

For example, the control part 52 includes a personal computer, and controls the operation of the control device 50. The control part 52 includes a processor 53 and a memory 54.

The processor 53 includes a central processing unit (CPU), a micro-processing unit (MPU), and the like.

The memory 54 includes a read only memory (ROM), a random access memory (RAM), and the like.

Incidentally, the control part 52 is not limited to the personal computer, and may be configured by one or a plurality of appropriate circuits such as an integrated circuit such as an IC chip and as an LSI. Further, the control part 52 may include, for example, a tablet terminal, a smartphone, or the like.

Furthermore, the control part 52 may include programmed hardware such as a digital signal processor (DSP) or a field programmable gate array (FPGA). Further, the control part 52 may include a system-on-a-chip (SoC)-FPGA.

3. Configuration of Control Part

As illustrated in FIG. 2, the control part 52 includes a communication unit 531, an instruction reception unit 532, a recording unit 533, a list generation unit 534, a display control unit 535, an operation control unit 536, an update unit 537, and an instruction storage unit 541.

Specifically, the processor 53 of the control part 52 executes a control program stored in the memory 54 or the storage device to function as the communication unit 531, the instruction reception unit 532, the recording unit 533, the list generation unit 534, the display control unit 535, the operation control unit 536, and the update unit 537. Further, the processor 53 of the control part 52 executes the control program stored in the memory 54 or the storage device to cause the memory 54 to function as the instruction storage unit 541.

The instruction storage unit 541 stores the contents and the order of instruction information MC indicating an instruction, which is received by the instruction reception unit 532, for operating the testing machine body 2. The contents and the order of the instruction information MC are recorded in the instruction storage unit 541 by the recording unit 533. In other words, the contents and the order of the instruction information MC are written in the instruction storage unit 541 by the recording unit 533.

The instruction information MC will be described with reference to FIG. 4.

Further, the instruction storage unit 541 stores information indicating operation instruction list LC generated by the list generation unit 534. The operation instruction list LC indicates the contents and the order of the instruction information MC.

The operation instruction list LC will be described with reference to FIGS. 7 and 8.

The communication unit 531 controls communication with the signal input/output device 40.

For example, the communication unit 531 receives the test force measurement value FD, the elongation measurement value ED, and the displacement measurement value XD from the signal input/output device 40.

Further, for example, in a case where the control part 52 executes position control on the test force measurement value FD, the control part 52 calculates the command value dX of the displacement measurement value XD such that the test force measurement value FD matches a test force target value FT. Then, the communication unit 531 transmits the command signal A4 indicating the command value dX to the servo amplifier 44 of the signal input/output device 40.

The communication unit 531 transmits various pieces of instruction information MC to, for example, the load cell 14, the displacement sensor 15, the servo valve 20, the hydraulic source GP, and the power source GE.

The communication unit 531 transmits, for example, the instruction information MC for setting the offset of each of the load cell 14 and the displacement sensor 15 to zero. Further, the communication unit 531 transmits the instruction information MC indicating activation to each of the hydraulic source GP and the power source GE, for example.

The instruction reception unit 532 receives an operation instruction for the testing machine body 2 on the basis of an operation from the user. Further, the instruction reception unit 532 receives an operation from the user and generates the instruction information MC indicating an instruction of an operation on the testing machine body 2.

In this embodiment, the user inputs all operations for giving an instruction on the operation on the testing machine body 2 by using the operation panel 51. In other words, the operation panel 51 is configured to be able to input all operations for giving an instruction on the operation on the testing machine body 2.

In this embodiment, a case where the instruction reception unit 532 receives an instruction regarding a "warm-up operation" of the testing machine body 2 will be described with reference to FIGS. 4 to 8. The "warm-up operation" indicates activating the testing machine body 2 to shift to a standby state of the tensile test before the testing machine body 2 is caused to execute the tensile test.

The recording unit 533 records the instruction information MC received by the instruction reception unit 532 in the instruction storage unit 541. In other words, the recording unit 533 writes the instruction information MC received by the instruction reception unit 532 in the instruction storage unit 541.

The list generation unit 534 generates the operation instruction list LC indicating the contents and the order of the instruction information MC. Further, the list generation unit 534 records the information indicating the operation instruction list LC in the instruction storage unit 541.

The operation instruction list LC will be described with reference to FIGS. 7 and 8.

The display control unit 535 displays the operation instruction list LC on the touch panel 511.

Further, the display control unit 535 displays various screens on the touch panel 511 on the basis of an operation from the user. The display control unit 535 displays, on the touch panel 511, a hydraulic source operation screen 650 illustrated in FIG. 5, an instruction list editing screen 750 illustrated in FIG. 7, and an instruction list execution screen 800 illustrated in FIG. 8, for example.

The operation control unit 536 operates the testing machine body 2 on the basis of the operation instruction list LC. For example, the operation control unit 536 reads the operation instruction list LC from the instruction storage unit 541, and operates the testing machine body 2 according to the contents and the order of the instruction information MC indicated by the operation instruction list LC.

Figure 8:
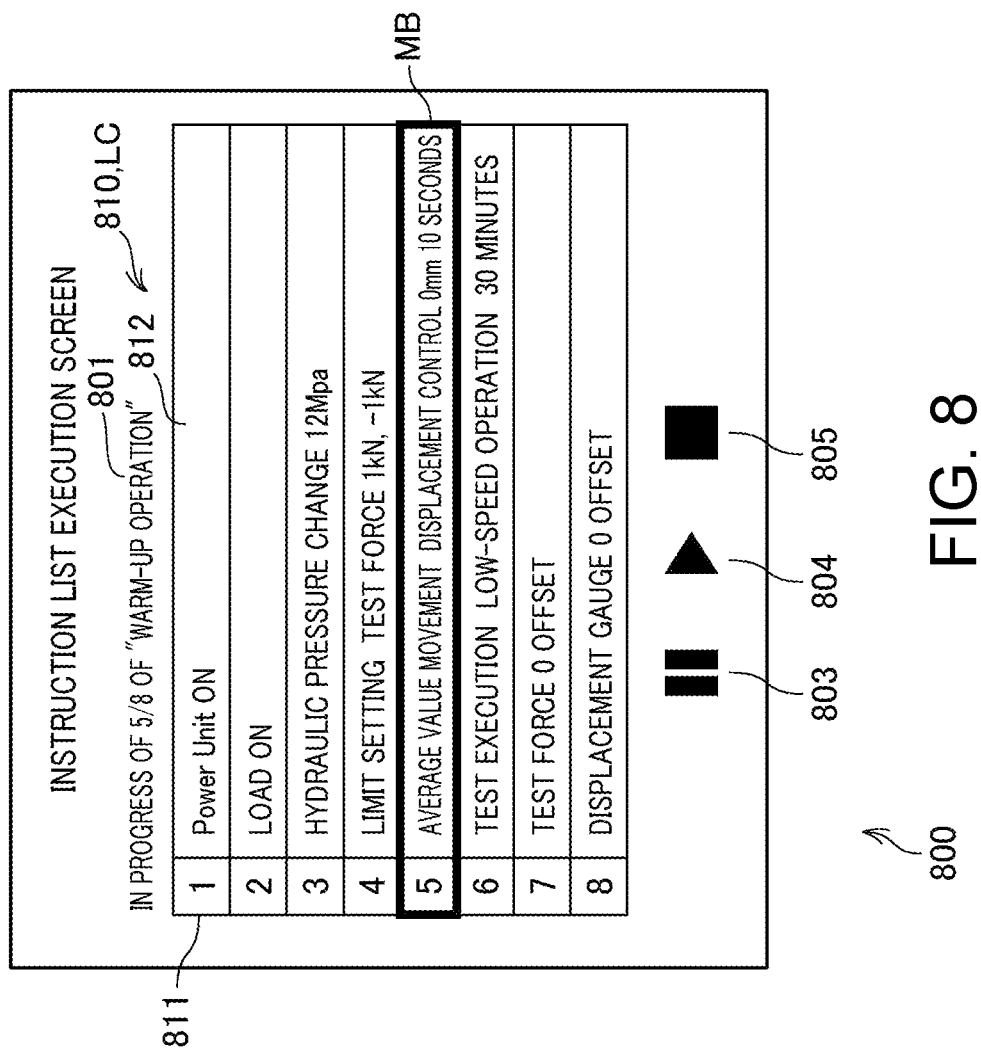
FIG. 8 is a screen view illustrating an example of an instruction list execution screen displayed during execution of the operation instruction list.

Further, in a case where the operation control unit 536 operates the testing machine body 2 on the basis of the operation instruction list LC, the display control unit 535 displays the instruction list execution screen 800 illustrated in FIG. 8 on the touch panel 511.

The update unit 537 receives an update operation of the user on the operation instruction list LC, and updates the operation instruction list LC according to the update operation. The "update operation" indicates an operation of updating the operation instruction list LC.

For example, the update unit 537 reads the operation instruction list LC from the instruction storage unit 541, and receives the update operation of the user on the operation instruction list LC. Then, the update unit 537 updates the operation instruction list LC according to the received update operation. Further, the update unit 537 records the updated operation instruction list LC in the instruction storage unit 541.

Figure 7:
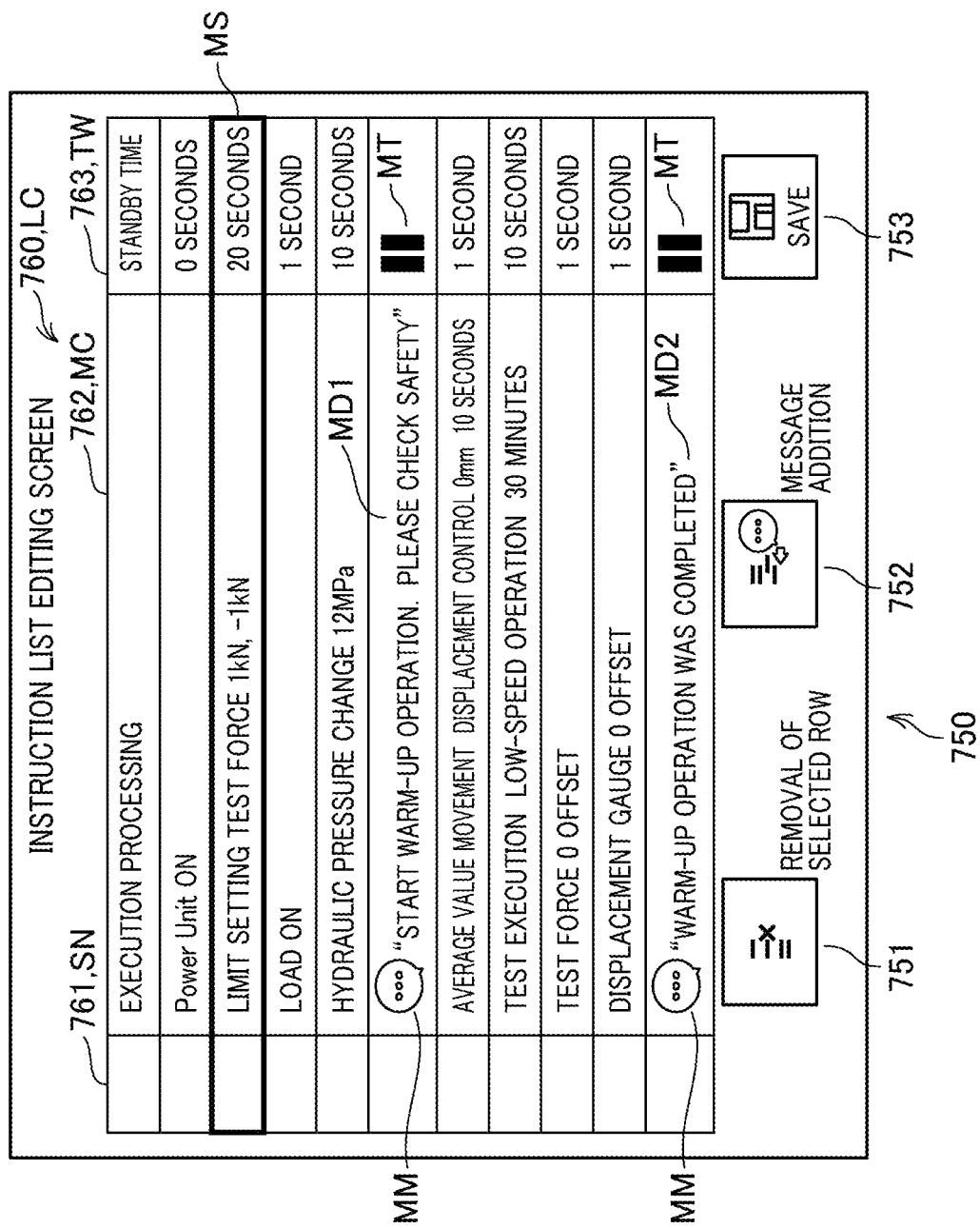
FIG. 7 is a screen view illustrating an example of an instruction list editing screen for updating an operation instruction list.

Further, in a case where the update unit 537 updates the operation instruction list LC, the display control unit 535 displays the instruction list editing screen 750 illustrated in FIG. 7 on the touch panel 511.

Figure 3:
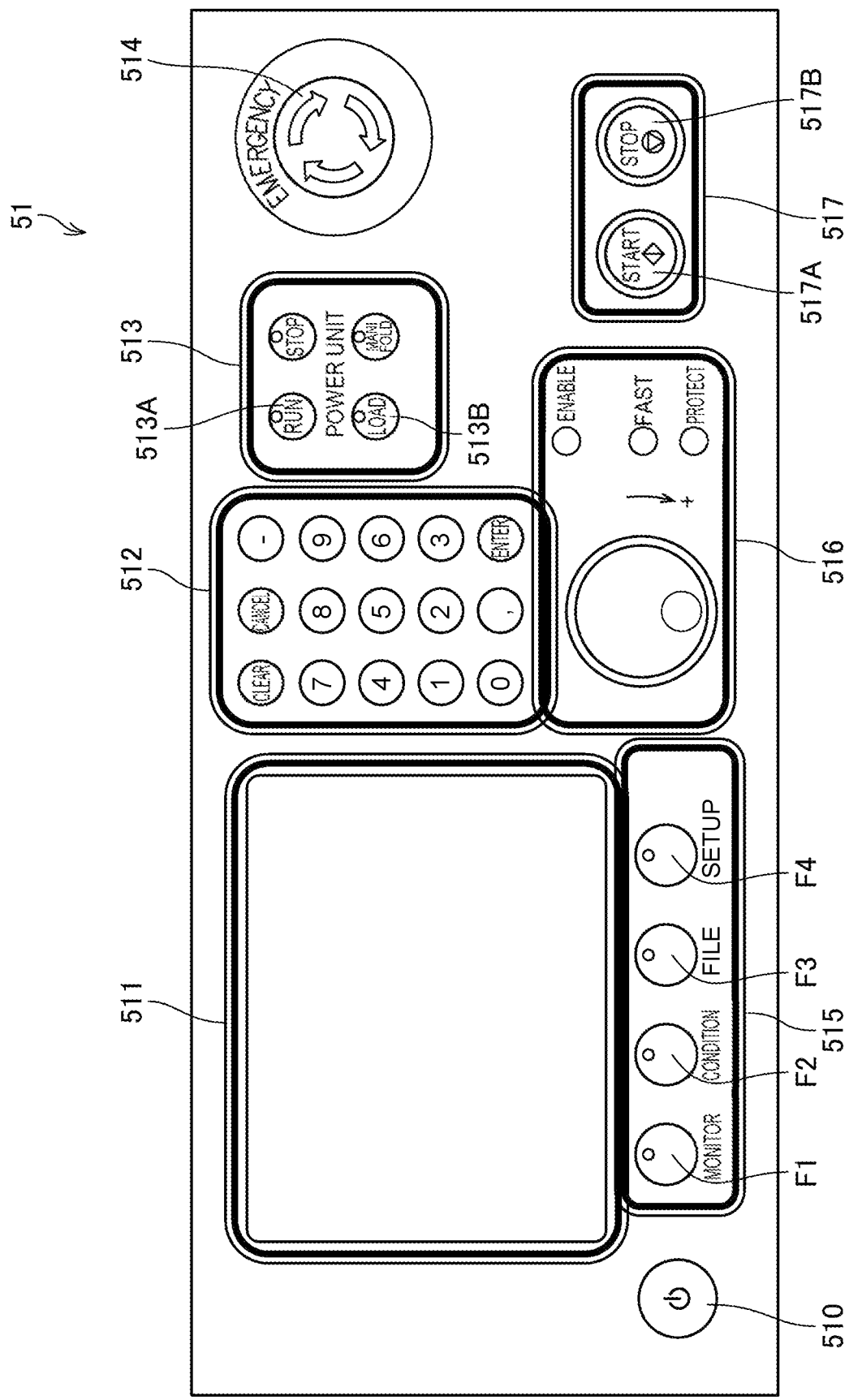
FIG. 3 is a diagram illustrating an example of a configuration of an operation panel of the control device.

FIG. 3 is a diagram illustrating an example of a configuration of the operation panel 51 of the control device 50.

As illustrated in FIG. 3, in addition to the touch panel 511 described with reference to FIG. 2, the operation panel 51 includes a power button 510, a numeric keypad 512, a hydraulic source operation unit 513, an emergency stop button 514, a function key unit 515, a setting key unit 516 (key), and a test operation key unit 517.

The power button 510 is pressed in a case where the power of the control device 50 is turned on or off.

The numeric keypad 512 includes a so-called numeric keypad and is pressed in a case where a numerical value is input.

The hydraulic source operation unit 513 is pressed in the case of operating the hydraulic source GP. The hydraulic source operation unit 513 includes an activation button 513A and a pressure button 513B.

The activation button 513A is pressed when the hydraulic source GP is turned on. By pressing the activation button 513A, the hydraulic pump of the hydraulic source GP is activated.

The pressure button 513B is pressed in a case where the pressure of the hydraulic pressure output from the hydraulic source GP is increased. The pressure button 513B increases the pressure of the hydraulic pressure output from the hydraulic source GP via the hydraulic control valve disposed in the hydraulic source GP.

The emergency stop button 514 is pressed to emergently stop the operation of the testing machine body 2.

Incidentally, the instruction to the testing machine body 2 in a case where the emergency stop button 514 is pressed is determined according to the operation being executed by the testing machine body 2. In other words, in a case where the emergency stop button 514 is pressed, the testing machine body 2 is instructed so that the user around the testing machine body 2 is in the safest state. For example, in a case where the emergency stop button 514 is pressed while the tensile test is in process of execution, the testing machine body 2 instructs the servo valve 20 to stop the expansion/contraction operation of the piston rod 181 of the hydraulic actuator 18.

The function key unit 515 includes four function keys F1 to F4. A function is set in advance for each of the four function keys F1 to F4.

For example, in a case where the user selects a screen to be displayed on the touch panel 511, the function key F1 is pressed. Further, in a case where the operation of the control device 50 is set, the function key F3 is pressed. Further, in a case where various pieces of information stored in the instruction storage unit 541 are read and displayed on the touch panel 511, the function key F4 is pressed.

The setting key unit 516 is operated to set or update a numerical value.

The test operation key unit 517 is operated to operate the operation of the tensile test. The test operation key unit 517 includes a start key 517A and a stop key 517B. The start key 517A is pressed to start the tensile test. The stop key 517B is pressed to stop the tensile test.

4. Specific Example of Processing of Control Part

Next, with reference to FIGS. 4 to 8, a case of the warm-up operation of the testing machine body 2 will be described as a specific example of the processing of the control part 52.

[4-1. Specific Example of Processing of Instruction Reception Unit]

FIG. 4 is a table illustrating an example of an operation instruction correspondence table 600 illustrating a relationship between the operation of the user and the instruction for the testing machine body 2.

In the left column of the operation instruction correspondence table 600, the operation CP by the user is described, and in the right column of the operation instruction correspondence table 600, the instruction information MC for the testing machine body 2 received by the instruction reception unit 532 is described in response to the operation CP by the user.

The operation CP by the user is sequentially executed from the upper side to the lower side of the operation instruction correspondence table 600. In order to distinguish each operation CP by the user, a step number SN is described at the left end of the operation instruction correspondence table 600.

In the following description, a step of executing the instruction information MC corresponding to the step number SN of "K" (here, the integer K is 1 to 8) may be referred to as a step SK. For example, step S1 indicates a step of executing the instruction information MC corresponding to the step number SN of "1". Further, for example, step S3 indicates a step of executing the instruction information MC corresponding to the step number SN of "3".

Incidentally, in this embodiment, a case will be described in which the power source GE is turned on, and the power source of the control device 50 is turned on in advance.

For example, in step S1, the user presses the activation button 513A illustrated in FIG. 3. The instruction reception unit 532 receives the pressing of the activation button 513A and generates the instruction information MC indicating an instruction for the testing machine body 2 such as "Power Unit ON (standby ten seconds)".

Incidentally, "(standby ten seconds)" indicates that, when the hydraulic source GP is instructed to be activated, a standby time TW from the completion of the activation of the hydraulic source GP to the start of the execution of the next step is ten seconds. The standby time TW is given to the instruction information MC by the instruction reception unit 532 when the instruction reception unit 532 generates the instruction information MC.

The standby time TW is set, for example, so that the user can easily check the operation of the testing machine body 2 in each step. Further, for example, the standby time TW is set to suppress simultaneous progress of a plurality of operations.

Further, for example, in step S2, the user presses the function key F1 illustrated in FIG. 3 to display a limit condition setting screen (not illustrated) on the touch panel 511. Then, various operations are performed on the limit condition setting screen to set the upper limit value of the test force F to "1 kN" and the lower limit value of the test force F to "−1 kN".

In a case where such a series of operations is received, the instruction reception unit 532 generates the instruction information MC indicating an instruction for the testing machine body 2 such as "limit setting test forces 1 kN and −1 kN (standby ten seconds)".

For example, in step S3, the user presses the pressure button 513B illustrated in FIG. 3. The instruction reception unit 532 receives the pressing of the pressure button 513B and generates the instruction information MC indicating an instruction for the testing machine body 2 such as "LOAD ON (standby ten seconds)".

For example, in step S4, the user presses the function key F1 illustrated in FIG. 3 to display the hydraulic source operation screen 650 illustrated in FIG. 4 on the touch panel 511. Then, various operations are performed on the hydraulic source operation screen 650 to give an instruction to increase the operation hydraulic pressure of the hydraulic source GP to "12 MPa".

In the case of receiving such a series of operations, the instruction reception unit 532 generates the instruction information MC indicating an instruction for the testing machine body 2 such as "hydraulic pressure change 12 MPa (standby ten seconds)".

Incidentally, the operation on the hydraulic source operation screen 650 will be described with reference to FIG. 5.

Figure 5:
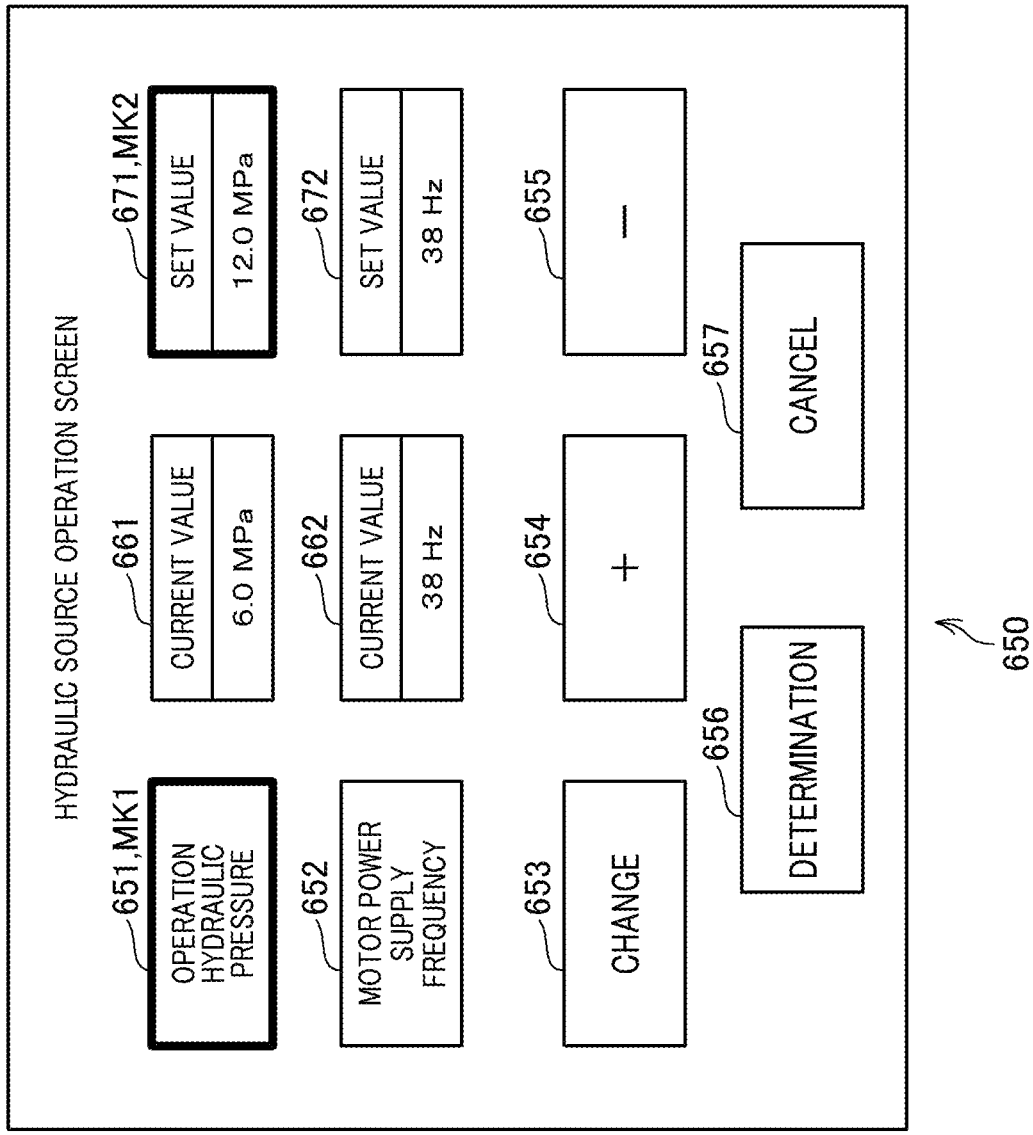
FIG. 5 is a screen view illustrating an example of a hydraulic source operation screen for operating a hydraulic source.

FIG. 5 is a screen view illustrating an example of the hydraulic source operation screen 650 for operating the hydraulic source GP.

On the hydraulic source operation screen 650, an operation hydraulic pressure selection button 651, a current value display portion 661, a set value display portion 671, a motor power supply frequency selection button 652, a current value display portion 662, a set value display portion 672, a change button 653, an increase button 654, a decrease button 655, a determination button 656, and a cancel button 657 are displayed on the touch panel 511 by the display control unit 535.

The operation hydraulic pressure selection button 651 is touched in a case where the set value of the operation hydraulic pressure of the hydraulic source GP is changed.

The current value display portion 661 displays the current value of the operation hydraulic pressure of the hydraulic source GP.

The set value display portion 671 displays the setting value of the operation hydraulic pressure of the hydraulic source GP.

The motor power supply frequency selection button 652 is touched in a case where the set value of the motor power supply frequency of the hydraulic source GP is changed.

The current value display portion 662 displays the current value of the motor power supply frequency of the hydraulic source GP.

The set value display portion 672 displays the set value of the motor power supply frequency of the hydraulic source GP.

The change button 653 is touched in a case where the operation hydraulic pressure of the hydraulic source GP or the set value of the motor power supply frequency is changed.

The increase button 654 is touched in a case where the operation hydraulic pressure of the hydraulic source GP or the set value of the motor power supply frequency is increased.

The decrease button 655 is touched in a case where the operation hydraulic pressure of the hydraulic source GP or the set value of the motor power supply frequency is decreased.

The determination button 656 is touched in a case where the set value of the operation hydraulic pressure of the hydraulic source GP or the motor power supply frequency is determined, and the hydraulic source GP is instructed to be the set set value.

The cancel button 657 is touched in a case where the set value of the operation hydraulic pressure of the hydraulic source GP or the motor power supply frequency is canceled.

In step S4 of FIG. 4, in order to give an instruction to increase the operation hydraulic pressure of the hydraulic source GP to "12 MPa", the following operation is performed by the user on the hydraulic source operation screen 650 illustrated in FIG. 5.

First, by touching the operation hydraulic pressure selection button 651 and touching the change button 653, the set value of the operation hydraulic pressure of the hydraulic source GP can be changed. When the operation hydraulic pressure selection button 651 is touched, marks MK1 and MK2 indicating that the set value of the operation hydraulic pressure of the hydraulic source GP can be changed are displayed by the display control unit 535. In FIG. 4, the mark MK1 is indicated by a thick line provided around the operation hydraulic pressure selection button 651, and the mark MK2 is indicated by a thick line provided around the set value display portion 671.

Next, by touching the increase button 654 and the decrease button 655, the set value of the operation hydraulic pressure of the hydraulic source GP displayed on the set value display portion 671 is changed to a set value desired by the user. Here, the set value of the operation hydraulic pressure of the hydraulic source GP is changed to 12 MPa.

Next, by touching the determination button 656, the hydraulic source GP is instructed such that the operation hydraulic pressure of the hydraulic source GP is changed to a set set value.

FIG. 6 is a table illustrating an example of a command CM for causing the instruction reception unit 532 to recognize an instruction.

A command list 700 illustrated in FIG. 6 illustrates a command identification information NP, the command CM, and an argument PR from the left side to the right side.

The command identification information NP is a number for identifying the command CM.

The command CM corresponds to the instruction information MC generated by the instruction reception unit 532 and indicates a command giving an instruction on the operation for the testing machine body 2.

The argument PR indicates various conditions given to the command CM.

The instruction reception unit 532 outputs the command CM to the testing machine body 2 in a case where the user performs a specific operation. The specific operation indicates an operation serving as a trigger for generating the command CM.

For example, in a case where the instruction reception unit 532 receives the pressing of the activation button 513A in step S1 of FIG. 4, the instruction reception unit 532 outputs, to the testing machine body 2, the command CM indicating "the activation of the hydraulic source" with the command identification information NP of "551". The pressing of the activation button 513A corresponds to an example of the specific operation.

For example, in a case where the series of operations described with reference to FIG. 5 is received in step S4 of FIG. 4, the instruction reception unit 532 outputs, to the testing machine body 2, the command CM indicating "average value movement" with the command identification information NP of "219". Further, the command CM is given, as the argument PR, that a monitoring target signal is the "operation hydraulic pressure of the hydraulic source GP" and that a reached value is "12 MPa". The touch of the determination button 656 illustrated in FIG. 5 corresponds to an example of the specific operation.

As described with reference to FIGS. 4 to 6, the instruction reception unit 532 outputs the command CM to the testing machine body 2 in a case where the user performs a specific operation. The specific operation indicates an operation serving as a trigger for generating the command CM. Further, the instruction reception unit 532 generates the instruction information MC when outputting the command CM to the testing machine body 2. Therefore, the instruction reception unit 532 can appropriately generate the instruction information MC on the basis of the operation from the user.

[4-2. Specific Example of Processing of Update Unit]

FIG. 7 is a screen view illustrating an example of the instruction list editing screen 750 for the updating operation instruction list LC. In the case of updating the operation instruction list LC, the instruction list editing screen 750 is displayed on the touch panel 511 by the display control unit 535 on the basis of an operation from the user.

On the instruction list editing screen 750, a list display portion 760, a row deletion button 751, a message addition button 752, and a save button 753 are displayed.

The list display portion 760 displays a step number display portion 761, an execution processing display portion 762, and a standby time display portion 763 from the left side to the right side.

The step number display portion 761 displays the step number SN.

The execution processing display portion 762 displays the instruction information MC corresponding to the step number SN.

The standby time display portion 763 displays the standby time TW.

The row deletion button 751 is touched in a case where one piece of instruction information MC is deleted from a plurality of pieces of instruction information MC displayed on the list display portion 760.

Specifically, the user deletes one piece of instruction information MC by executing the following operation on the instruction list editing screen 750.

First, by touching one piece of instruction information MC from the plurality of pieces of instruction information MC displayed on the list display portion 760, one piece of instruction information MC is selected from the plurality of pieces of instruction information MC displayed on the list display portion 760. In the selected instruction information MC, a selection mark MS is displayed by the display control unit 535. In FIG. 7, the instruction information MC in step S2 is selected. Next, by touching the row deletion button 751, the update unit 537 deletes the row including the instruction information MC in step S2.

The touch of the row deletion button 751 corresponds to an example of the "update operation".

The message addition button 752 is touched in a case where the instruction information MC for displaying a message on the touch panel 511 is added to the list display portion 760.

In the instruction list editing screen 750, first instruction information MD1 is added between the instruction information MC in step S4 and the instruction information MC in step S5. When the operation of the testing machine body 2 corresponding to the instruction information MC in step S4 is ended, the message indicated by the first instruction information MD1 is displayed on the touch panel 511 by the display control unit 535.

Further, the second instruction information MD2 is added after the instruction information MC in step S8. When the operation of the testing machine body 2 corresponding to the instruction information MC in step S8 is ended, the message indicated by the second instruction information MD2 is displayed on the touch panel 511 by the display control unit 535.

In the case of adding the first instruction information MD1, the user executes the following operation on the instruction list editing screen 750.

First, by touching one piece of instruction information MC from the plurality of pieces of instruction information MC displayed on the list display portion 760, one piece of instruction information MC is selected from the plurality of pieces of instruction information MC displayed on the list display portion 760. Here, the instruction information MC of step S4 corresponding to the instruction information MC executed immediately before the first instruction information MD1 is selected. Then, by touching the message addition button 752, the display control unit 535 inserts one row between the instruction information MC in step S4 and the instruction information MC in step S5. In the execution processing display portion 762 of the inserted row, a message mark MM is displayed by the display control unit 535, and a state is brought about where a message can be input on the right side of the message mark MM by the update unit 357. The user inputs a message using a keyboard (not illustrated) or the like.

The second instruction information MD2 is also added similarly to the first instruction information MD1.

A temporary stop mark MT is displayed by the display control unit 535 on the standby time display portion 763 corresponding to each of the first instruction information MD1 and the second instruction information MD2.

The temporary stop mark MT is displayed on the standby time display portion 763 by the display control unit 535 when the message addition button 752 is touched.

The temporary stop mark MT indicates that the operation of the testing machine body 2 is temporarily stopped. For example, the temporary stop mark MT corresponding to the first instruction information MD1 indicates that the operation of the testing machine body 2 is temporarily stopped when the operation of the testing machine body 2 corresponding to the instruction information MC in step S4 is ended.

The touch of the message addition button 752 corresponds to an example of the "update operation".

By selecting one piece of instruction information MC from the plurality of pieces of instruction information MC displayed on the list display portion 760, the update unit 537 can update the selected instruction information MC and the standby time TW corresponding to the instruction information MC. For example, in a case where the instruction information MC in step S2 is selected as illustrated in FIG. 7, the update unit 537 can update the "1 kN, −1 kN" included in the instruction information MC on the basis of an input operation from the user.

The save button 753 is touched by the user in a case where the instruction storage unit 541 is caused to store the operation instruction list LC updated by the row deletion button 751, the message addition button 752, and the like. In a case where the save button 753 is touched, the update unit 537 records, in the instruction storage unit 541, the operation instruction list LC displayed on the list display portion 760 of the instruction list editing screen 750.

As described with reference to FIG. 7, the update unit 537 can receive the update operation of the user on the operation instruction list LC, and appropriately update the operation instruction list LC according to the update operation. Therefore, the user can easily update the operation instruction list LC.

Since the operation of the testing machine body 2 is temporarily stopped when a message is displayed, the user can check the content of the message with time. Therefore, user convenience can be improved.

[4-3. Specific Example of Processing of Operation Control Unit]

FIG. 8 is a screen view illustrating an example of the instruction list execution screen 800 displayed during the execution of the operation instruction list LC. The instruction list execution screen 800 is displayed on the touch panel 511 by the display control unit 535 in a case where the operation control unit 536 operates the testing machine body 2 on the basis of the operation instruction list LC.

On the instruction list execution screen 800, an execution state display portion 801, a list display portion 810, a stop button 803, an execution button 804, and an end button 805 are displayed.

The list display portion 810 displays the operation instruction list LC, and includes a step number display portion 811 and an execution processing display portion 812.

The step number display portion 811 displays the step number SN.

The execution processing display portion 812 displays the instruction information MC corresponding to the step number SN.

The execution state display portion 801 indicates, from among eight steps with the step numbers SN from "1" to "8", the step number SN of a step being executed. In FIG. 8, "in progress of 5/8" is displayed on the execution state display portion 801, and the operation of the testing machine body 2 corresponding to the instruction information MC of step S5 is in progress among the eight steps.

Further, the display control unit 535 displays the executing mark MB on the list display portion 810 corresponding to step S5 being executed.

The stop button 803 is touched in a case where the operation of the testing machine body 2 is temporarily stopped. In a case where the stop button 803 is touched, the operation control unit 536 temporarily stops the operation of the testing machine body 2.

The execution button 804 is touched in a case where the "warm-up operation" including the eight steps with the step numbers SN from "1" to "8" is started. Further, the execution button 804 is touched in a case where the operation of the testing machine body 2 temporarily stopped by the touch of the stop button 803 is resumed.

Incidentally, the step of resuming may be the same as the step temporarily stopped by the touch of the stop button 803, or may be a step different from the step temporarily stopped by the touch of the stop button 803.

In a case where the same step as the step temporarily stopped by the touch of the stop button 803 is resumed, the operation of the temporarily stopped testing machine body 2 is resumed.

In a case where a step different from the temporarily stopped step is resumed by the touch of the stop button 803, the operation of the testing machine body 2 corresponding to this step is started.

The end button 805 is touched in a case where the operation of the testing machine body 2 is ended.

As described with reference to FIG. 8, the display control unit 535 displays the execution state display portion 801 and the executing mark MB, whereby the operation instruction list LC is displayed on the touch panel 511 such that the instruction information MC corresponding to the operation being executed by the testing machine body 2 can be visually recognized. Therefore, the user can easily check the progress of the plurality of steps included in the operation instruction list LC. Therefore, user convenience can be improved.

In this embodiment, the display control unit 535 displays the execution state display portion 801 and the executing mark MB, but the display control unit 535 may display at least one of the execution state display portion 801 and the executing mark MB.

5. Operation of Control Part

Next, the processing of the control part 52 will be described with reference to FIGS. 9 and 10.

Figure 9:
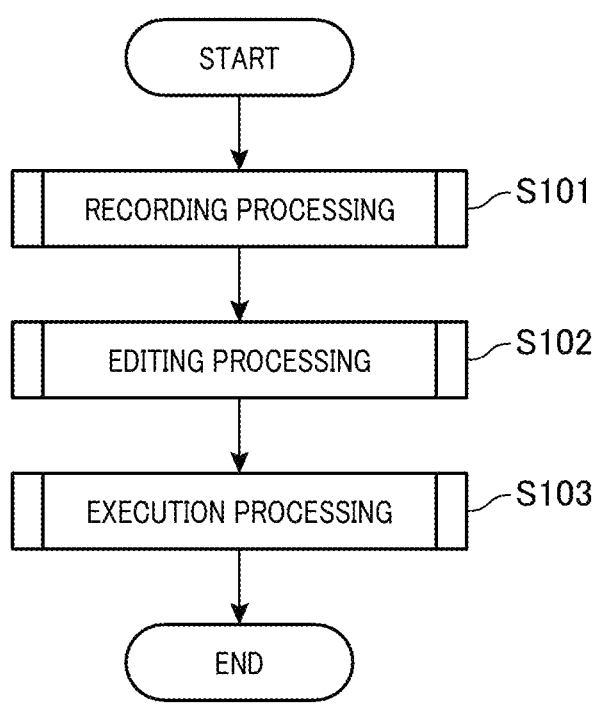
FIG. 9 is a flowchart illustrating an example of the entire processing executed by a control part.

FIG. 9 is a flowchart illustrating an example of the entire processing executed by the control part 52 according to this embodiment.

First, in step S101, the control part 52 executes "recording processing". The "recording processing" indicates processing of recording information indicating the operation instruction list LC in the instruction storage unit 541.

Specifically, the instruction reception unit 532 receives an instruction to operate the testing machine body 2 on the basis of the operation from the user, and generates the instruction information MC indicating the instruction to operate the testing machine body 2. Then, the recording unit 533 records the instruction information MC received by the instruction reception unit 532 in the instruction storage unit 541. Next, the list generation unit 534 generates the operation instruction list LC indicating the contents and the order of the instruction information MC, and records the generated operation instruction list LC in the instruction storage unit 541.

Next, in step S102, the control part 52 executes "editing processing". The "editing processing" indicates processing of updating the operation instruction list LC on the basis of an operation from the user and recording the updated operation instruction list LC in the instruction storage unit 541.

Specifically, the display control unit 535 displays the instruction list editing screen 750 illustrated in FIG. 7 on the basis of an operation from the user. Then, the update unit 537 updates the operation instruction list LC on the basis of the operation of the user on the instruction list editing screen 750, and records the updated operation instruction list LC in the instruction storage unit 541.

Next, in step S103, the control part 52 executes "execution processing", and then the processing ends. The "execution processing" indicates processing of instructing the testing machine body 2 to perform the operation corresponding to the instruction information MC according to the operation instruction list LC.

Specifically, the display control unit 535 displays the instruction list execution screen 800 illustrated in FIG. 8 on the basis of an operation from the user. Then, the operation control unit 536 transmits, to the testing machine body 2, the instruction information MC corresponding to the operation instruction list LC on the basis of the operation of the user on the instruction list execution screen 800, thereby causing the testing machine body 2 to execute a series of operations (for example, "warm-up operation" or the like).

Figure 10:
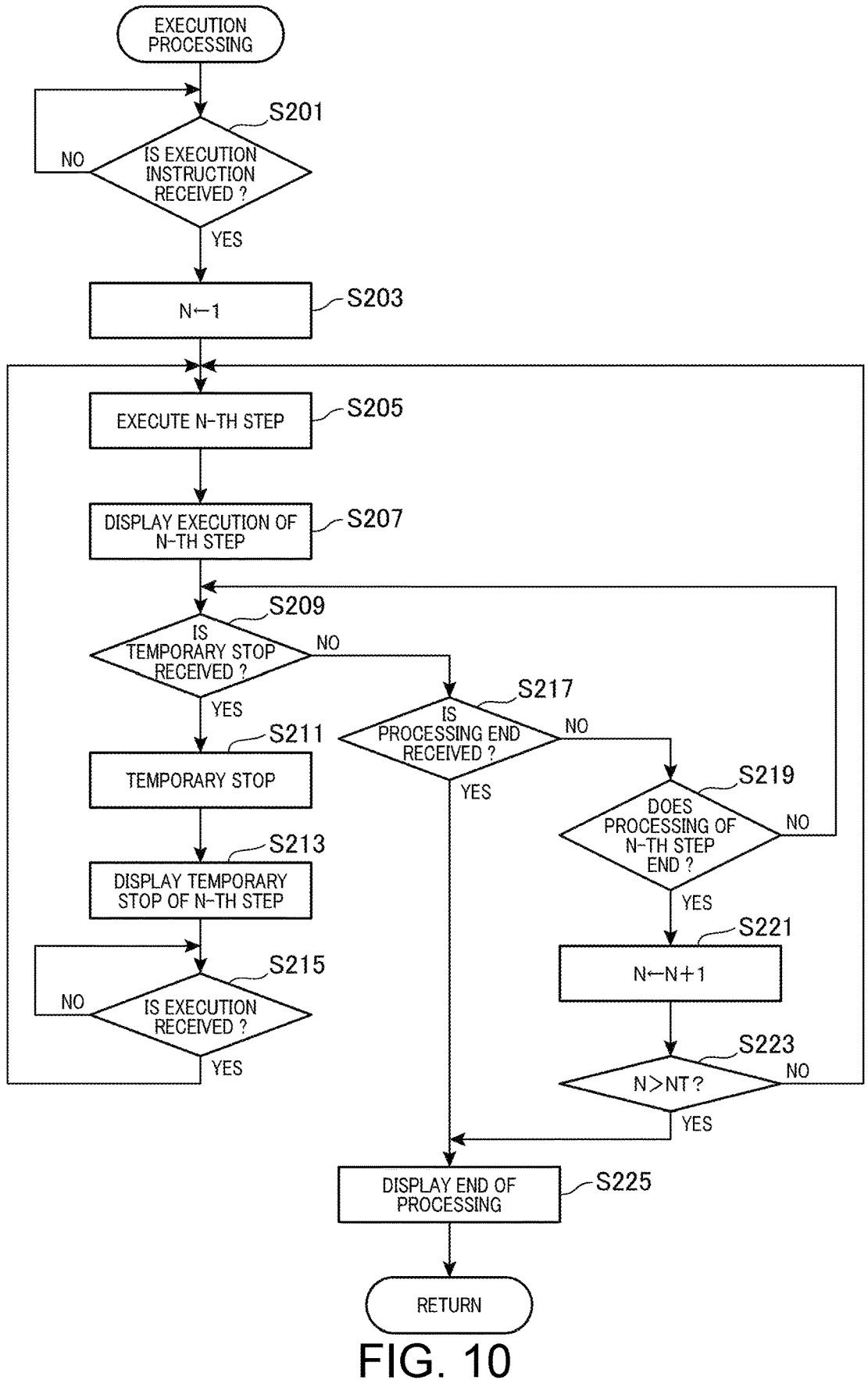
FIG. 10 is a flowchart illustrating an example of execution processing of the control part.

FIG. 10 is a flowchart illustrating an example of execution processing of the control part 52 executed in step S103 of FIG. 9.

Incidentally, in FIG. 10, a case will be described in which the display control unit 535 displays the instruction list execution screen 800 illustrated in FIG. 8 on the touch panel 511 in advance.

First, in step S201, the operation control unit 536 determines whether or not an execution instruction to start the "warm-up operation" is received.

In a case where the operation control unit 536 determines that the execution instruction to start the "warm-up operation" is not received (step S201; NO), the process enters a standby state. In a case where the operation control unit 536 determines that the execution instruction to start the "warm-up operation" is received (step S201; YES), the process proceeds to step S203.

Then, in step S203, the operation control unit 536 sets the initial value of the step number SN to "1". Incidentally, in FIG. 10, the number of steps N indicates the step number SN.

Next, in step S205, the operation control unit 536 outputs the instruction information MC of the N-th step to the testing machine body 2 and causes the testing machine body 2 to execute the operation corresponding to the instruction information MC. The N-th step corresponds to step SN. The number of steps N is one of 1 to 8.

Next, in step S207, the display control unit 535 displays, on the instruction list execution screen 800, that the operation of the N-th step is being executed by the testing machine body 2.

Next, in step S209, the operation control unit 536 determines whether or not the stop button 803 is touched, that is, the instruction for temporary stop is received.

In a case where the operation control unit 536 determines that the instruction for temporary stop is not received (step S209; NO), the process proceeds to step S217. In a case where the operation control unit 536 determines that the instruction for temporary stop is received (step S209; YES), the process proceeds to step S211.

Then, in step S211, the operation control unit 536 temporarily stops the operation of the testing machine body 2 corresponding to the instruction information MC of the N-th step.

Next, in step S213, the display control unit 535 displays, on the instruction list execution screen 800, that the operation of the testing machine body 2 corresponding to the instruction information MC of the N-th step is temporarily stopped. The display control unit 535 causes, for example, the stop button 803 of the instruction list execution screen 800 to blink.

Next, in step S215, the operation control unit 536 determines whether or not the execution button 804 is touched, that is, an execution instruction is received.

In a case where the operation control unit 536 determines that the execution instruction is not received (step S215; NO), the process enters a standby state. In a case where the operation control unit 536 determines that the execution instruction is received (step S215; YES), the process returns to step S205.

In a case where the operation control unit 536 determines that the instruction for temporary stop is not received (step S209; NO), in step S217, the operation control unit 536 determines whether or not the end button 805 is touched, that is, an instruction for processing end is received.

In a case where the operation control unit 536 determines that the instruction for processing end is received (step S217; YES), the process proceeds to step S225. In a case where the operation control unit 536 determines that the instruction for processing end is not received (step S217; NO), the process proceeds to step S219.

Then, in step S219, the operation control unit 536 determines whether or not the operation of the testing machine body 2 corresponding to the instruction information MC of the N-th step ends.

In a case where the operation control unit 536 determines that the operation of the testing machine body 2 corresponding to the instruction information MC of the N-th step does not end (step S219: NO), the process returns to step S209. In a case where the operation control unit 536 determines that the operation of the testing machine body 2 corresponding to the instruction information MC of the N-th step ends (step S219: YES), the process proceeds to step S221.

Then, in step S221, the operation control unit 536 increments the number of steps N by one.

Next, in step S223, the operation control unit 536 determines whether or not the number of steps N is larger than the total number of steps NT. The total number of steps NT indicates a maximum value of the number of steps. In the embodiment illustrated in FIGS. 4 to 8, the total number of steps NT is "8".

In a case where the operation control unit 536 determines that the number of steps N is not larger than the total number of steps NT (step S223; NO), the process returns to step S205. In a case where the operation control unit 536 determines that the number of steps N is larger than the total number of steps NT (step S223: YES), the process proceeds to step S225.

Then, in step S225, the display control unit 535 displays, on the instruction list execution screen 800, that the process ends. Thereafter, the process ends.

In this manner, the operation control unit 536 can operate the testing machine body 2 on the basis of the operation instruction list LC. Therefore, the labor of the operator can be reduced, and the occurrence of an erroneous operation can be suppressed.

The user can operate the stop button 803, the execution button 804, and the end button 805 displayed on the instruction list execution screen 800 to cause the testing machine body 2 to be operated on the basis of these operations. Therefore, user convenience can be improved.

6. Aspects and Effects

It is understood by those skilled in the art that the above-described embodiment is a specific example of the following aspects.

(Item 1)

A material testing machine according to a first aspect includes: a testing machine body that executes a material test; an instruction reception unit that receives an operation instruction for the testing machine body on the basis of an operation from a user; and an instruction storage unit that stores contents and an order of instruction information indicating the operation instruction, which is received by the instruction reception unit, for the testing machine body.

According to the material testing machine described in item 1, the instruction storage unit stores the contents and the order of the instruction information indicating the operation instruction for the testing machine body.

Therefore, the testing machine body can be operated on the basis of the instruction information. Therefore, it is possible to reduce the labor of the operator and suppress the occurrence of the erroneous operation.

(Item 2)

The material testing machine described in item 1 further includes: a list generation unit that generates an operation instruction list indicating the contents and the order of the instruction information; and a display control unit that displays the operation instruction list on a display.

According to the material testing machine described in item 2, the display control unit displays, on the display, the operation instruction list indicating the contents and the order of the instruction information.

Therefore, the operator can easily check the contents and the order of the instruction information. Therefore, the convenience of the operator can be improved.

(Item 3)

The material testing machine described in item 2 further includes: an operation control unit that operates the testing machine body on the basis of the operation instruction list.

According to the material testing machine described in item 3, the operation control unit operates the testing machine body on the basis of the operation instruction list.

Therefore, the testing machine body can be operated on the basis of the operation instruction list. Therefore, the labor of the operator can be reduced, and the occurrence of an erroneous operation can be suppressed.

(Item 4)

In the material testing machine described in item 3, the display control unit displays the operation instruction list on the display such that the instruction information corresponding to an operation being executed by the testing machine body is visually recognizable.

According to the material testing machine described in item 4, the display control unit displays the operation instruction list on the display such that the instruction information corresponding to the operation being executed by the testing machine body is visually recognizable.

Therefore, the operator can visually recognize the instruction information corresponding to the operation being executed by the testing machine body with the operation instruction list displayed on the display. Therefore, the convenience of the operator can be improved.

(Item 5)

The material testing machine described in any one of items 2 to 4, further includes: an update unit that receives an update operation of the user for the operation instruction list and updates the operation instruction list in accordance with the update operation.

According to the material testing machine described in item 5, the update unit updates the operation instruction list in accordance with the update operation of the user.

Therefore, the operator can easily update the operation instruction list. Therefore, the convenience of the operator can be improved.

(Item 6)

The material testing machine described in any one of items 1 to 5, further includes: a recording unit that records the instruction information in the instruction storage unit.

According to the material testing machine described in item 6, the recording unit records the instruction information in the instruction storage unit.

Therefore, it is possible to store the contents and the order of the instruction information indicating the operation instruction, which is received by the instruction reception unit, for the testing machine body in the instruction storage unit. Therefore, it is possible to operate the testing machine body on the basis of the instruction information. As a result, the labor of the operator can be reduced, and the occurrence of erroneous operation can be suppressed.

(Item 7)

A control device of a material testing machine according to a second aspect is communicably connected to a testing machine body executing a material test and controls an operation of the testing machine body, the control device including: an instruction reception unit that receives an operation instruction for the testing machine body on the basis of an operation from a user; and an instruction storage unit that stores contents and an order of instruction information indicating the operation instruction, which is received by the instruction reception unit, for the testing machine body.

According to the control device of the material testing machine described in item 7, the same operations and effects as those of the material testing machine described in item 1 are obtained.

7. Other Embodiments

Incidentally, the tensile testing machine 1 according to this embodiment is merely an example of an aspect of the material testing machine according to the present invention, and can be arbitrarily modified and applied without departing from the gist of the present invention.

For example, in this embodiment, a case where the material testing machine is the tensile testing machine 1 has been described, but this embodiment is not limited thereto. The material testing machine may apply a test force to the test piece TP and deform the test piece TP to perform a material test. For example, the material testing machine may be a compression testing machine, a bending testing machine, or a torsion testing machine.

In this embodiment, a case where the testing machine body 2 is caused to execute a series of operations configuring the "warm-up operation" has been described, but this embodiment is not limited thereto. The series of operations may be executed by the testing machine body 2. For example, a "test preparation operation" may be executed by the testing machine body 2, or a "test end operation" may be executed by the testing machine body 2.

Each functional unit illustrated in FIGS. 1 and 2 illustrates a functional configuration, and a specific implementation form is not particularly limited. That is, hardware individually corresponding to each functional unit does not necessarily need to be mounted, and it is of course possible to have a configuration in which functions of a plurality of functional units are realized by one processor executing a program. Further, some of the functions implemented by software in the above embodiments may be implemented by hardware, or some of the functions implemented by hardware may be implemented by software.

In the processing units of the flowcharts illustrated in FIGS. 9 and 10, the processing of the control part 52 are divided to facilitate understanding according to main processing contents. The division method and the name of the processing units illustrated in the flowcharts of FIGS. 9 and 10 are not restrictive. According to the processing content, the processing units can be divided into more processing units, or one processing unit can be divided to include more processing. Further, the processing order of the above flowchart is not limited to the illustrated example.

The control device 50 of the tensile testing machine 1 causes the processor 53 included in the control part 52 to execute a control program corresponding to the control method of the tensile testing machine 1. Further, the control program can also be recorded in a computer-readable recording medium. As the recording medium, a magnetic or optical recording medium or a semiconductor memory device can be used. Specific examples thereof include portable or fixed recording media such as a flexible disk, an HDD, a compact disk read only memory (CD-ROM), a DVD, a Blu-ray (registered trademark) disc, a magneto-optical disk, a flash memory, and a card-type recording medium. Further, the recording medium may be a non-volatile storage device such as a RAM, a ROM, or an HDD which is an internal storage device included in the control part 52. Further, the control program may be stored in a server device or the like, and the control program may be downloaded from the server device to the control part 52.

REFERENCE SIGNS LIST

1 TENSILE TESTING MACHINE (MATERIAL TESTING MACHINE)
2 TESTING MACHINE BODY
3 CONTROL UNIT
10 CROSSHEAD
14 LOAD CELL
15 DISPLACEMENT SENSOR
18 HYDRAULIC ACTUATOR
181 PISTON ROD
19 DIFFERENTIAL TRANSFORMER
20 SERVO VALVE
21 UPPER GRIPPER
22 LOWER GRIPPER
26 TABLE
28, 29 PILLAR
40 SIGNAL INPUT/OUTPUT DEVICE
42 FIRST SENSOR AMPLIFIER
43 THIRD SENSOR AMPLIFIER
44 SERVO AMPLIFIER
45 SECOND SENSOR AMPLIFIER
50 CONTROL DEVICE
51 OPERATION PANEL
510 POWER BUTTON
511 TOUCH PANEL (DISPLAY)
512 NUMERIC KEYPAD
513 HYDRAULIC SOURCE OPERATION UNIT
513A ACTIVATION BUTTON
513B PRESSURE BUTTON
514 EMERGENCY STOP BUTTON
515 FUNCTION KEY UNIT
516 SETTING KEY UNIT
517 TEST OPERATION KEY UNIT
517A START KEY
517B STOP KEY
52 CONTROL PART
53 PROCESSOR
531 COMMUNICATION UNIT
532 INSTRUCTION RECEPTION UNIT
533 RECORDING UNIT
534 LIST GENERATION UNIT
535 DISPLAY CONTROL UNIT
536 OPERATION CONTROL UNIT
537 UPDATE UNIT
54 MEMORY
541 INSTRUCTION STORAGE UNIT
600 OPERATION INSTRUCTION CORRESPONDENCE TABLE
650 HYDRAULIC SOURCE OPERATION SCREEN
700 COMMAND LIST
750 INSTRUCTION LIST EDITING SCREEN
800 INSTRUCTION LIST EXECUTION SCREEN
801 EXECUTION STATE DISPLAY PORTION
803 STOP BUTTON
804 EXECUTION BUTTON
805 END BUTTON
810 LIST DISPLAY PORTION
CM COMMAND
CP OPERATION
F1 to F4 FUNCTION KEY
FD TEST FORCE MEASUREMENT VALUE
GE POWER SOURCE
GP HYDRAULIC SOURCE
LC OPERATION INSTRUCTION LIST
MC INSTRUCTION INFORMATION
SG1 TEST FORCE MEASUREMENT SIGNAL
SG2 DISPLACEMENT MEASUREMENT SIGNAL
SG3 ELONGATION MEASUREMENT SIGNAL
SN STEP NUMBER
TW STANDBY TIME
XD DISPLACEMENT MEASUREMENT VALUE

What is claimed is:

1. A material testing machine comprising:
a testing machine body that executes a material test;
an instruction reception unit that receives an operation instruction for the testing machine body which is to be performed during the material test on a basis of an operation from a user, and receives a preparation instruction for a test preparation operation which is to be performed before the material test; and
an instruction storage unit that stores contents and an order of instruction information indicating the operation instruction and the preparation instruction, which is received by the instruction reception unit, for the testing machine body.

2. The material testing machine according to claim 1, further comprising:
a list generation unit that generates an operation instruction list indicating the contents and the order of the instruction information; and
a display control unit that displays the operation instruction list on a display.

3. The material testing machine according to claim 2, further comprising:
an operation control unit that operates the testing machine body on a basis of the operation instruction list.

4. The material testing machine according to claim 3, wherein
the display control unit displays the operation instruction list on the display such that the instruction information corresponding to an operation being executed by the testing machine body is visually recognizable.

5. The material testing machine according to claim 2, further comprising:
an update unit that receives an update operation of the user for the operation instruction list and updates the operation instruction list in accordance with the update operation.

6. The material testing machine according to claim 1, further comprising:
a recording unit that records the instruction information in the instruction storage unit.

7. A control device of a material testing machine which is communicably connected to a testing machine body executing a material test and controls an operation of the testing machine body, the control device comprising:
an instruction reception unit that receives an operation instruction for the testing machine body which is to be performed during the material test on a basis of an operation from a user, and receives a preparation instruction for a test preparation operation which is to be performed before the material test; and
an instruction storage unit that stores contents and an order of instruction information indicating the operation instruction and the preparation instruction, which is received by the instruction reception unit, for the testing machine body.

* * * * *